United States Patent
Tanikawa et al.

(10) Patent No.: US 8,443,830 B2
(45) Date of Patent: May 21, 2013

(54) HEATER BUILT-IN VALVE

(75) Inventors: Tsuyoshi Tanikawa, Osaka (JP); Michio Yamaji, Osaka (JP); Tadayuki Yakushijin, Osaka (JP); Hiroshi Fukuchi, Osaka (JP); Keisuke Ishibashi, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 703 days.

(21) Appl. No.: 12/450,504

(22) PCT Filed: Apr. 1, 2008

(86) PCT No.: PCT/JP2008/056452
§ 371 (c)(1),
(2), (4) Date: Mar. 3, 2010

(87) PCT Pub. No.: WO2008/120788
PCT Pub. Date: Oct. 9, 2008

(65) Prior Publication Data
US 2010/0193717 A1  Aug. 5, 2010

(30) Foreign Application Priority Data

Apr. 2, 2007  (JP) ................. 2007-096680

(51) Int. Cl.
*F16K 49/00* (2006.01)
(52) U.S. Cl.
USPC ............... 137/341; 251/61.2; 251/335.3
(58) Field of Classification Search
USPC  137/334, 341; 251/61, 61.2, 335.3; 174/21 R
See application file for complete search history.

(56) References Cited

U.S. PATENT DOCUMENTS

| | | | | |
|---|---|---|---|---|
| 2,399,402 A * | 4/1946 | Spengler | ........................ | 439/126 |
| 2,822,418 A * | 2/1958 | Dinnick | ...................... | 174/88 C |
| 3,322,142 A * | 5/1967 | Baumann | ...................... | 137/334 |
| 3,902,695 A * | 9/1975 | Worwetz | ...................... | 251/61.2 |
| 4,240,610 A * | 12/1980 | Trimble | ...................... | 251/335.3 |
| 4,516,599 A * | 5/1985 | Nakaya et al. | ................ | 137/375 |
| 5,230,364 A * | 7/1993 | Leng et al. | .................... | 137/514 |
| 5,915,410 A * | 6/1999 | Zajac | ............................ | 137/341 |
| 6,394,418 B1* | 5/2002 | Duan et al. | ................. | 251/335.3 |
| 6,433,308 B1* | 8/2002 | Ishigaki et al. | .............. | 219/201 |
| 6,708,721 B2* | 3/2004 | Fukuda et al. | ................ | 137/341 |

FOREIGN PATENT DOCUMENTS

| | | |
|---|---|---|
| JP | 3-70611 | 7/1991 |
| JP | 03-234988 A | 10/1991 |
| JP | 05-187324 A | 7/1993 |
| JP | 6-1753 | 1/1994 |
| JP | 07-198063 A | 8/1995 |
| JP | 11-153235 A | 6/1999 |
| JP | 2004-156720 A | 6/2004 |
| JP | 2006-105206 A | 4/2006 |

OTHER PUBLICATIONS

International Search Report mailed May 20, 2008, issued on PCT/JP2008/056452.

* cited by examiner

*Primary Examiner* — Eric Keasel
*Assistant Examiner* — Time Aigbe
(74) *Attorney, Agent, or Firm* — Edwards Wildman Palmer LLP

(57) ABSTRACT

A heater built-in valve usable even under a high-temperature condition beyond 200° C. is provided.

Piston driving means 7 has an upper compressed-air introducing chamber 24 for moving a piston 6 downward, and a lower compressed-air introducing chamber 25 for moving the piston 6 upward. Piston sealing means 8 has an upper bellows 29 that seals the upper compressed-air introducing chamber 24, and a lower bellows 30 that seals the lower compressed air introducing chamber 25.

9 Claims, 3 Drawing Sheets

HEATER BUILT-IN VALVE

TECHNICAL FIELD

This invention relates to a heater built-in valve, and particularly to a heater built-in valve for use under a high-temperature condition such as higher than 200° C.

BACKGROUND ART

In Patent Document 1, there is disclosed a heater built-in valve including a valve box provided with a fluid passage, a casing provided above the valve box, a valve rod that moves up and down a valve element opening and closing the fluid passage, a piston arranged movably upward and downward inside the casing and fixed to the valve rod, piston driving means for moving up and down the piston, and a heater that heats a vicinity of the valve element. The heater is intended to prevent gas flowing through the valve from being solidified, and heats the gas to 130° C. to 150° C.

Patent Document 1: Unexamined Japanese Patent Publication No. H7-198063

DISCLOSURE OF THE INVENTION

Problems to be Solved by the Invention

There has been a problem that the heater built-in valve in the above-described Patent Document 1 heats the gas to 130° C. to 150° C., and it cannot endure a high temperature such as higher than 200° C. (e.g., 450° C.).

An object of this invention is to provide a heater built-in valve that can be used under a high-temperature condition beyond 200° C.

Means for Solving the Problem

A heater built-in valve of the present invention includes a valve box provided with a fluid passage, a casing provided above the valve box, a valve rod that moves up and down a valve element opening and closing the fluid passage, a piston that is arranged movably upward and downward inside the casing and is fixed to the valve rod, piston driving means for moving up and down the piston, heating means for heating a vicinity of the valve element, and sealing means for sealing between the piston and the casing, the heater built-in valve, wherein the piston driving means has an upper compressed-air introducing chamber for moving the piston downward, and a lower compressed-air introducing chamber for moving the piston upward, and the sealing means has an upper bellows that seals the upper compressed-air introducing chamber, and a lower bellows that seals the lower compressed-air introducing chamber.

The heating means includes a heater, a TC (thermo sensor) and the like, and as the heater, for example, a cartridge heater in which a heating wire is putted into a metallic tube is suitable. However, a tape heater in which a heating wire is woven into a fiberglass material may be employed, and in addition, various types of heaters such as a sheath heater, a microheater and a plate heater can be used. The sensor for temperature control (TC) is also built into the valve together with the heater.

The piston is moved downward by compressed air being introduced to the upper compressed-air introducing chamber, and is moved upward by compressed air being introduced to the lower compressed-air introducing chamber, and both the upward and downward operations by the compressed air in this manner make unnecessary a coil spring or the like, which is made of a material depending on the temperature in property and of concern in heat resistance. Moreover, in a case where the spring is used, when the valve is opened, the spring is compressed from a set length, so that a larger load than a load at the time of set length is needed, and in response, a downward force needs to be increased. In contrast, in this aspect, since the above-described necessity is eliminated, downsizing of the valve is enabled. In addition, sealing both the upper compressed-air introducing chamber and the lower compressed-air introducing chamber by the bellows makes unnecessary O-rings, which are of concern in heat resistance. In this manner, the heater built-in valve that endures high-temperature use at 200° C. and higher (e.g., at about 450° C.) is attained.

The bellows are made of metal, and for example, is formed of a stainless steel, a cobalt-based alloy, a nickel-based alloy, a copper-based alloy or the like. As the bellows are arbitrarily used a molded bellows obtained by making a cylinder from a metallic material, and applying a pressure from within to form mountains as an outer diameter, a welded bellows obtained by joining disk-shaped, thin metal plates to which undulation and pressing are precisely applied, while welding inner edges and outer edges alternately, and so on.

The piston includes a large-diameter part having a flange part in a lower end portion and a small-diameter part that continues below the large-diameter part, the casing is provided with a large-diameter piston containing part and a small-diameter piston containing part having a smaller diameter than that of the large-diameter piston containing part, the upper bellows is provided between a top wall of the casing and the flange part of the piston large-diameter part, and the lower bellows has a smaller diameter than that of the upper bellows, and is provided between an upper end portion of the piston small-diameter part and a lower end portion of the small-diameter piston containing part.

This configuration makes an area of the piston facing the upper compressed-air introducing chamber larger than an area of the piston facing the lower compressed-air introducing chamber, and makes a capacity of the lower compressed-air introducing chamber smaller than a capacity of the upper compressed-air introducing chamber. While the upper bellows receives pressure from both the outer and inner sides, the lower bellows receives pressure only from the outer side, and only needs to have a sealing function for the valve rod, so that making the lower bellows smaller can downsize the actuator (portion including the piston, the piston driving means and the piston sealing means).

Further, the piston includes a shaft part having a flange part in an upper end portion and an outer cylindrical part that is fixed to the flange part of the shaft part in an upper end portion, and has a flange part in a lower end portion, an upper bellows is provided between the flange part of the piston outer cylindrical part and a top portion of the casing opposed to this flange part, a lower bellows is provided between the flange part of the piston shaft part and a bellows receiving part provided in the casing so as to be opposed to this flange part.

In this configuration as well, an area of the piston facing the upper compressed-air introducing chamber is larger than an area of the piston facing the lower compressed-air introducing chamber, and a capacity of the lower compressed-air introducing chamber is smaller than a capacity of the upper compressed-air introducing chamber. Accordingly, while the upper bellows receives pressure from both the outer and inner sides, the lower bellows receives pressure only from the outer side, and only needs to have a sealing function for the valve rod, so that making the lower bellows smaller can downsize the actuator (portion including the piston, the piston driving means and the piston sealing means). In addition, in this configuration, a lower end surface of the lower bellows is located slightly below a lower end surface of the upper bellows, so that the upper bellows and the lower bellows can be arranged in almost the vertically same position, which can reduce a vertical dimension containing the upper bellows and the lower bellows.

Further, the piston includes a large-diameter cylindrical part and a small-diameter cylindrical part that continues below the large-diameter cylindrical part, and a first upper bellows whose upper end is placed above an upper end of the piston large-diameter cylindrical part is arranged inside the piston large-diameter cylindrical part, and a second upper bellows whose upper end is placed above the upper end of the piston large-diameter cylindrical part is arranged outside the piston large-diameter cylindrical part, respectively, so that bellows receiving parts that support the upper end portions of the respective bellows are provided in an upper portion of the casing, by which the upper compressed-air introducing chamber is formed by an upper end surface of the piston large-diameter cylindrical part, the upper portion of the casing, the first upper bellows and the second upper bellows, while a lower bellows is arranged outside the piston small-diameter cylindrical part, and a bellows receiving part that supports a lower end surface of the lower bellows is provided in a circumferential wall of the casing, by which the lower compressed-air introducing chamber is formed by the circumferential wall of the casing, the second upper bellows, a lower end portion of the piston large-diameter cylindrical part and the lower bellows. In this case, it is preferable that the valve rod is made hollow, and that a heater and a sensor of the heating means are arranged inside of the valve rod, and that a lead wire of the heating means is pulled out from an opening at an upper end of the valve rod to be drawn out from a top wall of the casing.

Pulling out the lead wire of the heating means from the opening at the upper end of the valve rod to be drawn out from the top wall of the casing alleviates load on the lead wire of the heating means when the heating means moves up and down together with the valve rod.

It is preferable that a joint is attached in a compressed-air inlet of each of the upper compressed-air introducing chamber and the lower compressed-air introducing chamber, and that this joint has a first sleeve fixed to a circumferential edge portion of a through-hole, a cap nut rotatably fitted onto the first sleeve, a second sleeve confronted to the first sleeve with a gasket interposed, and a male screw member that is fitted onto the second sleeve and is screwed into the cap nut.

This configuration of the joint is more preferable when the heater built-in valve is arranged in vacuum atmosphere (e.g., in a vacuum furnace). In such use in the vacuum atmosphere, particles and the like need to be prevented from coming out to the vacuum atmosphere. With the joint configuration in which the metallic gasket is subjected to plastic deformation to seal, the sealing of the atmosphere inside the heater built-in valve is assured, and by discharging the particles and the like generated inside the heater built-in valve to outside through piping using this joint, the particles and the like can be prevented from coming out to the vacuum atmosphere.

For a similar reason, it is preferable that a through-hole into which a lead wire of the heating means (the heater, the TC and the like) is inserted is provided in the casing, and that a joint for drawing the lead wire of the heating means to outside is attached to a circumferential edge portion of this through-hole, the joint having a first sleeve fixed to a circumferential edge portion of the through-hole, a cap nut rotatably fitted onto the first sleeve, a second sleeve confronted to the first sleeve with a gasket interposed, and a male screw member that is fitted onto the second sleeve and is screwed into the cap nut. Since gas and the like can be generated from the heater, the lead wire and the like by temperature rise and come out to the vacuum atmosphere, piping with the highly reliable joint in which the metallic gasket is subjected to plastic deformation to seal (SUS-made piping) is performed to thereby discharge the above-described gas and the like, which surely prevents pollution of the vacuum atmosphere accompanying the built-in of the heater.

Nevertheless, a through-hole into which a lead wire of the heating means is inserted is provided in the casing, and a joint for drawing the lead wire of the heating means to outside is attached to a circumferential edge portion of this through-hole, the joint having the same configuration as joints for connecting piping to the upper compressed-air introducing chamber and the lower compressed-air introducing chamber. This makes it easy to draw the lead wire of the heating means to outside, and enables sharing of components.

A heater may be attached to the valve rod so as to be movable together with the valve rod, or a heater may be attached to a heater holding member fixed to the casing so as not to move together with the movement of the valve rod. In the former case, it is preferable that a lower end surface of the heater abuts against the valve element, and in the latter case, it is preferable that a lower end surface of the heater abuts against the valve element in an opening position where the valve rod has moved upward.

Moreover, in the heater built-in valve according to this invention, it is preferable that coating is applied to sliding portions of the actuator to increase lubricating property. While normally, a grease for lubrication is applied to the sliding portions of the actuator, as to a general grease, oil is vaporized at about 200° C., and thereafter, the operation of the sliding portions of the actuator is maintained by Ni powder and the like. Even in the case of a fluorine-based grease, oil of which is difficult to vaporize, the use for a long period at a highest operating temperature (e.g., at about 360° C.) tends to gradually vaporize components. The vaporization of the oil of the grease causes degradation in the lubricating function, and the pollution inside the vacuum furnace. Thus, increase in slidability by the special coating can eliminate the grease, which can solve the problems of the degradation in the lubricating function and the pollution inside the vacuum furnace it is preferable that the portion to be coated is the whole surface of the valve rod, which secures a lubricating effect in contact portions between the valve rod and the casing, the valve element and the like.

Preferably, the special coating is coating with nonelectrolytic plating treatment. In this case, a plating layer includes nickel-phosphorous based, cobalt-phosphorous based. The nickel-phosphorous based is excellent in corrosion resistance and cost performance, the cobalt-phosphorous is excellent in preventing scoring. The plating layer may include nickel-phosphorous-tungsten based, nickel-boron based, and nickel-boron-tungsten based nonelectrolytic plating layers since they are excellent in heat resistance.

Advantageous Effects of the Invention

According to the heater built-in valve of this invention, the piston driving means has the upper compressed-air introducing chamber for moving the piston downward and the lower compressed-air introducing chamber for moving the piston upward, and the sealing means has the upper bellows that seals the upper compressed-air introducing chamber and the lower bellows that seals the lower compressed-air introducing chamber, by which the heather built-in valve without using a coil spring as a biasing member, and an O-ring as a sealing member is realized, and as a result, the valve can be used even under a high-temperature condition beyond 200° C.

Figure 1:
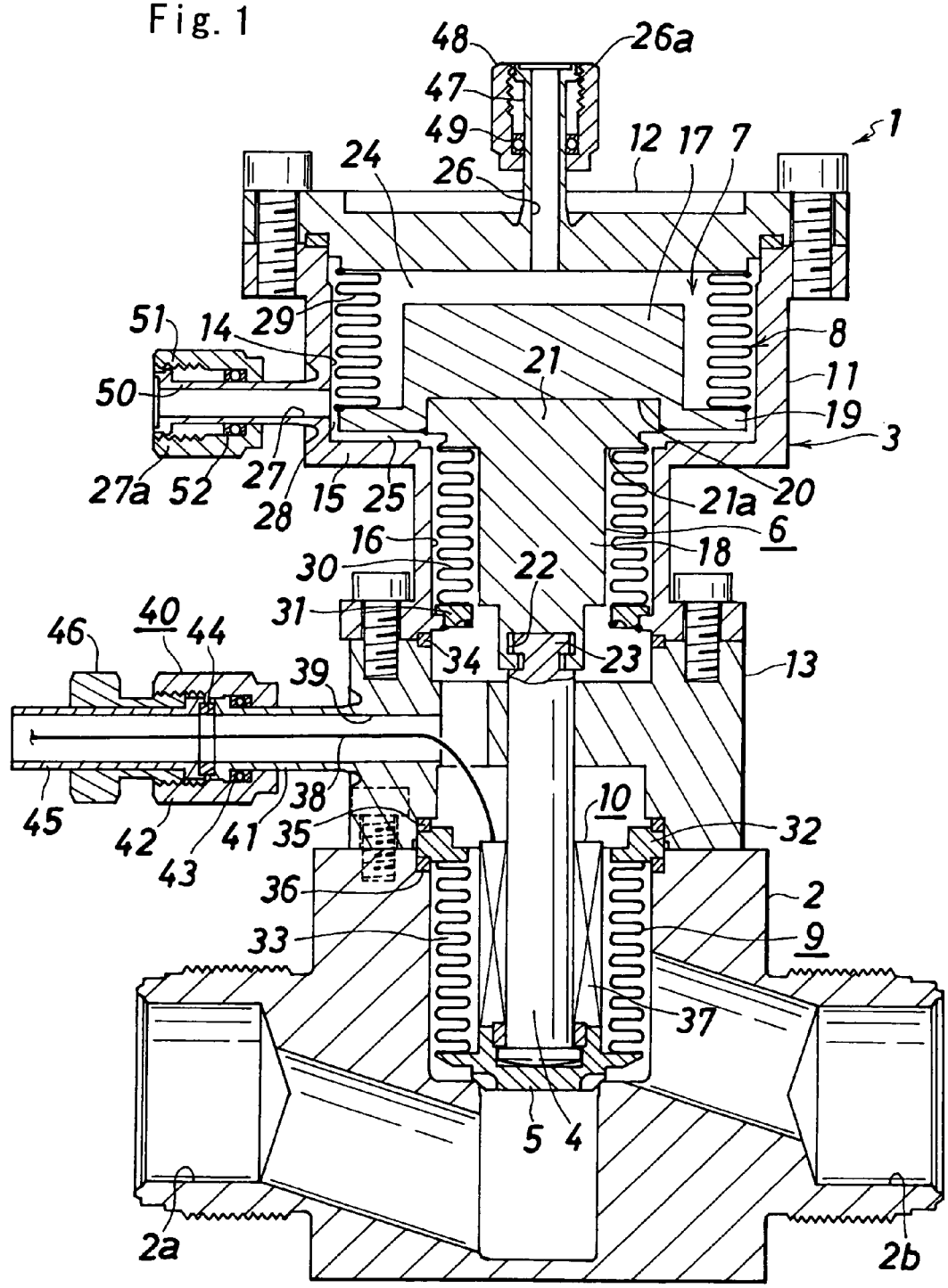
FIG. 1 is a cross-sectional view showing a first embodiment of a heater built-in valve according to this invention.

EXPLANATION OF SYMBOLS (1) Heater built-in valve
(2) Valve box
(2a) Fluid inflow passage (fluid passage)
(2b) Fluid outflow passage (fluid passage)
(3) Casing
(4) Valve rod
(5) Valve element
(6) Piston
(7) Piston driving means
(8) Piston sealing means
(10) Heating means
(12) Casing top wall
(14) Large-diameter piston containing part
(16) Small-diameter piston containing part
(17) Large-diameter part.
(18) Small-diameter part
(19) Flange part
(24) Upper compressed-air introducing chamber
(25) Lower compressed-air introducing chamber
(29) Upper bellows
(30) Lower bellows
(37) Cartridge heater
(38) Heater lead wire
(39) Through-hole
(40) Joint
(41) First sleeve
(42) Cap nut
(45) Second sleeve
(46) Male screw member
(61) Shaft part
(61a) Flange part
(62) Outer cylindrical part
(62a) Flange part
(63a) Annular inward projected part (bellows receiving part)
(64) Upper bellows
(65) Lower bellows
(66) Cartridge heater
(67) Heater holding ring (heater holding member)
(68) Heater lead wire
(71) Piston large-diameter cylindrical part
(72) Piston small-diameter cylindrical part
(76) First upper bellows
(77) Second upper bellows
(78) Lower bellows

BEST MODE FOR CARRYING OUT THE INVENTION

Hereinafter, embodiments of this invention are described with reference to the drawings. In the following description, up and down (vertical, vertically), and right and left indicate up and down (vertical, vertically), and right and left in respective figures.

A first embodiment of a heater built-in valve (1) according to this invention, as shown in FIG. 1, includes a valve box (2) provided with a fluid inflow passage (2a) and a fluid outflow passage (2b), a casing (3) fixed to an upper end portion of the valve box (2), a valve rod (4) that is inserted into an upper portion of the valve box (2) movably upward and downward, and has an upper portion inside the casing (3), a valve element (5) that is suspended and supported by an lower end portion of the valve rod (4) to open and close the fluid inflow passage (2a) with the upward and downward movement of the valve rod (4), a piston (6) fixed to an upper end portion of the valve rod (4), piston driving means (7) for moving up and down the piston (6), piston sealing means (8) for sealing between the piston (6) and the casing (3), valve rod sealing means (9) for sealing between the valve rod (4) and the passages (2a) (2b) inside the valve box (2), and heating means (10) for heating a vicinity of the valve element (5).

The casing (3) has a cylindrical upper casing (11) having a top wall (12) and opened downward, and a cylindrical lower casing (13) interposed between the upper casing (11) and the valve box (2).

Nickel-phosphorous based nonelectrolytic plating is applied to the whole surface of the valve rod (4), which secures slidability between the valve rod (4) and the casing (3), between the valve rod (4) and the valve element (5), in a joining part (22) between the valve rod (4) and the piston (6), and the like. While in order to secure the slidability, a grease such as "Never-Seez" has been conventionally used, there is a problem that the use of such a grease causes pollution inside a vacuum furnace due to vaporized oil thereof, even if it is a high-temperature grease. Applying the nonelectrolytic plating to the whole surface of the valve rod (4) secures the slidability even at 450° C. and higher, and in this manner, the use of the grease, which is a cause of the pollution inside the vacuum furnace, is avoided.

The piston (6) includes a large-diameter part (17) that moves up and down inside an upper portion of the upper casing (11), and a small-diameter part (18) that continues below this and moves up and down inside a lower portion of the upper casing (11). Correspondingly, the upper casing (11) is provided with a large-diameter piston containing part (14) on the upper side, and a small-diameter piston containing part (16) that continues below this with a step part (15) interposed.

The piston large-diameter part (17) has a flange part (19) in a lower end thereof, and has a recessed part (20) in a center of a lower surface. The piston small-diameter part (18) has, in an upper end portion thereof, a flange part (21) fitted into, and fixed to the recessed part (20) of the piston large-diameter part (17). In a lower end portion of the piston small-diameter part (18), an engagement recessed part (22) into which the upper end portion of the valve rod (4) is fitted is formed, and an engagement projected part (23) provided in the upper end portion thereof is fitted into the engagement recessed part (22), by which the valve rod (4) is suspended and supported by the piston small-diameter part (18).

The piston driving means (7) has an upper compressed-air introducing chamber (24) for moving the piston (6) downward by compressed air introduced from outside, and a lower compressed-air introducing chamber (25) for moving the piston (6) upward by compressed air introduced from outside. The upper compressed-air introducing chamber (24) is formed between respective upper surfaces of the piston large-diameter part (17) and the flange part (19), and the top wall (12) of the upper casing (11). In a central portion of the top wall (12) of the upper casing (11), a compressed air inlet (26) with a joint (26a) is provided. The lower compressed-air introducing chamber (25) is formed between a lower surface of the flange part (19) of the piston large-diameter part (17) and an upper surface of the step part (15) of the upper casing (11). In a lower end portion of a circumferential wall of the large-diameter piston containing part (14) of the upper casing (11), a compressed air inlet (27) with a joint (27a) is provided. A gap (28), which is a compressed air passage, is formed between an outer circumferential surface of the flange part (19) of the piston large-diameter part (17) and a circumferential wall of the upper casing (11) so that the compressed air can flow into the lower compressed-air introducing chamber (25) from this compressed air inlet (27).

At the time of downward movement, the piston (6) is prevented from further moving downward by the flange part (19) of the piston large-diameter part (17) abutting against the step part (15) of the upper casing (11), and at the time of upward movement, the piston (6) is prevented from further moving upward by the upper surface of the piston large-diameter part (17) abutting against a lower surface of the casing top wall (12).

The piston sealing means (8) has an upper bellows (29) made of metal that seals the upper compressed-air introducing chamber (24), and a lower bellows (30) made of metal that seals the lower compressed-air introducing chamber (25). The upper bellows (29) is sandwiched and held between a lower surface of an outer circumferential edge portion of the casing top wall (12) and the upper surface of the flange part (19) of the piston large-diameter part (17). The lower bellows (30) is sandwiched and held between a lower surface (21a) of the flange part (21) of the piston small-diameter part (18) and an upper surface of an upper fixed ring (bellows receiving part) (31) fixed to an inner circumferential surface of a circumferential wall upper end portion of the lower casing (13). The upper bellows (29) receives an outward pressure from the upper compressed-air introducing chamber (24), and receives an inward pressure from the lower compressed-air introducing chamber (25). The lower bellows (30) receives only an inward pressure from the lower compressed-air introducing chamber (25). Accordingly, a diameter of the lower bellows (30) can be made smaller than that of the upper bellows (29), which downsizes the valve (1).

The valve rod sealing means (9) has a valve element-side bellows (33) made of metal sandwiched and held between an outer circumferential edge portion of the valve element (5), whose diameter is made larger than that of the valve rod (4), and a lower fixed ring (bellows receiving part) (32) fixed to an inner circumferential surface of a circumferential wall lower end portion of the lower casing (13).

The respective bellows (29) (30) (33) are fixed to the fixed rings (31) (32) and corresponding portions of the piston (6) by welding, and metal gaskets (34) (35) (36) are provided at portions requiring the sealing such as between the fixed rings (31) (32) and the casing (3).

The heating means (10) has a cartridge heater (37) that is arranged so as to surround a portion of the valve rod (4) inside the valve box (2) and moves up and down together with the valve rod (4), a heater lead wire (38) including a lead wire of the cartridge heater (37), a lead wire of a TC (thermo sensor) and the like, and a joint (40) attached to a circumferential edge portion of a through-hole (39) provided in a circumferential wall of the lower casing (13) to draw the heater lead wire (38) to outside.

This joint (40) is used to interconnect pipes in piping for gas supply, and has a first sleeve (41) with a flange, which is fixed to the circumferential edge portion of the through-hole (39) by welding, a cap nut (42) rotatably fitted onto the first sleeve (41), a thrust ring (43) interposed between the flange provided in a left end portion (axially-outer end portion) of the first sleeve (41) and the cap nut (42), a second sleeve (45) with a flange, which is confronted to the first sleeve (41) with a gasket (44) interposed, and a male screw member (46) that is fitted onto the second sleeve (45) and is screwed into the cap nut (42). The heater lead wire (38) is inserted into the joint 40 and is drawn to outside. In this manner, the joint (40) used when the pipes through which the fluid flows are interconnected is utilized to handle the wiring of the heating means.

A lower end surface of the cartridge heater (37) abuts against the valve element (5). The cartridge heater (37), although detailed illustration is omitted, includes a metallic tube with one end portion closed and another end portion opened, a heating wire of a nichrome wire or the like and a filler of magnesium powder or the like, which are provided inside the tube, and an electrode wire connected to the heating wire, and is capable of high output and high-temperature heating. A temperature of the cartridge heater is controlled, for example, through voltage ON-OFF control by temperature control. As a sensor for temperature control, for example, a platinum thin-film temperature sensor, a sheath type K thermocouple or the like is used.

The joints (26a) (27a) provided in the compressed air inlets (26) (27) are identical to the joint (40) for drawing the heater lead wire (38) to outside in the heating means (10), and to one joint component member including illustrated first sleeves (47) (50) with a flange, a cap nut (48) (51), and thrust rings (49) (52), another joint component member including a second sleeve with a flange and a male screw member, whose illustration is omitted, is confronted with a gasket (illustration is omitted) interposed, which prevents particles and the like from coming out to the vacuum atmosphere when the heater built-in valve (1) is arranged in the vacuum atmosphere (e.g., in the vacuum furnace).

According to the heater built-in valve (1) of this invention, when the compressed air is introduced into the upper compressed-air introducing chamber (24) from the compressed air inlet (26) provided in the top wall (12) of the upper casing (11), the piston (6) moves downward, and with this, the valve rod (4) also moves downward. As a result, as shown in the figure, the valve element (5) shuts an upward opening of the fluid inflow passage (2a). When the introduction of the compressed air into the upper compressed-air introducing chamber (24) is stopped to enable the discharge, and the compressed air is introduced into the lower compressed-air introducing chamber (25) from the compressed air inlet (27) provided in the circumferential wall of the upper casing (11), the piston (6) moves upward, and with this, the valve rod (4) also moves upward. As a result, the valve element (5) departs from the upward opening of the fluid inflow passage (2a), and the fluid introduced from the fluid inflow passage (2a) is discharged from the fluid outflow passage (2b).

A downward force that the piston (6) receives from the upper compressed-air introducing chamber (24) is made relatively large because the piston large-diameter part (17) having a large area receives a pressure of the compressed air, so that a force for shutting the fluid inflow passage (2a) is made large. Moreover, since a capacity of the lower compressed-air introducing chamber (25) is smaller than a capacity of the upper compressed-air introducing chamber (24), when the compressed air is introduced into the lower compressed-air introducing chamber (25), the upward force is immediately generated, which makes the upward movement of the valve rod (4) quick.

According to the heater built-in valve (1) of the above-described first embodiment, the heater (cartridge heater) (37) is attached to the valve rod (4), and accordingly, the heater (37) moves with the upward and downward movement of the valve rod (4). The heater (37) does not need to move, and thus, may be fixed. Moreover, the piston (6) and the piston sealing means (8) are not limited to the foregoing. An example thereof is shown in FIG. 2.

Figure 2:
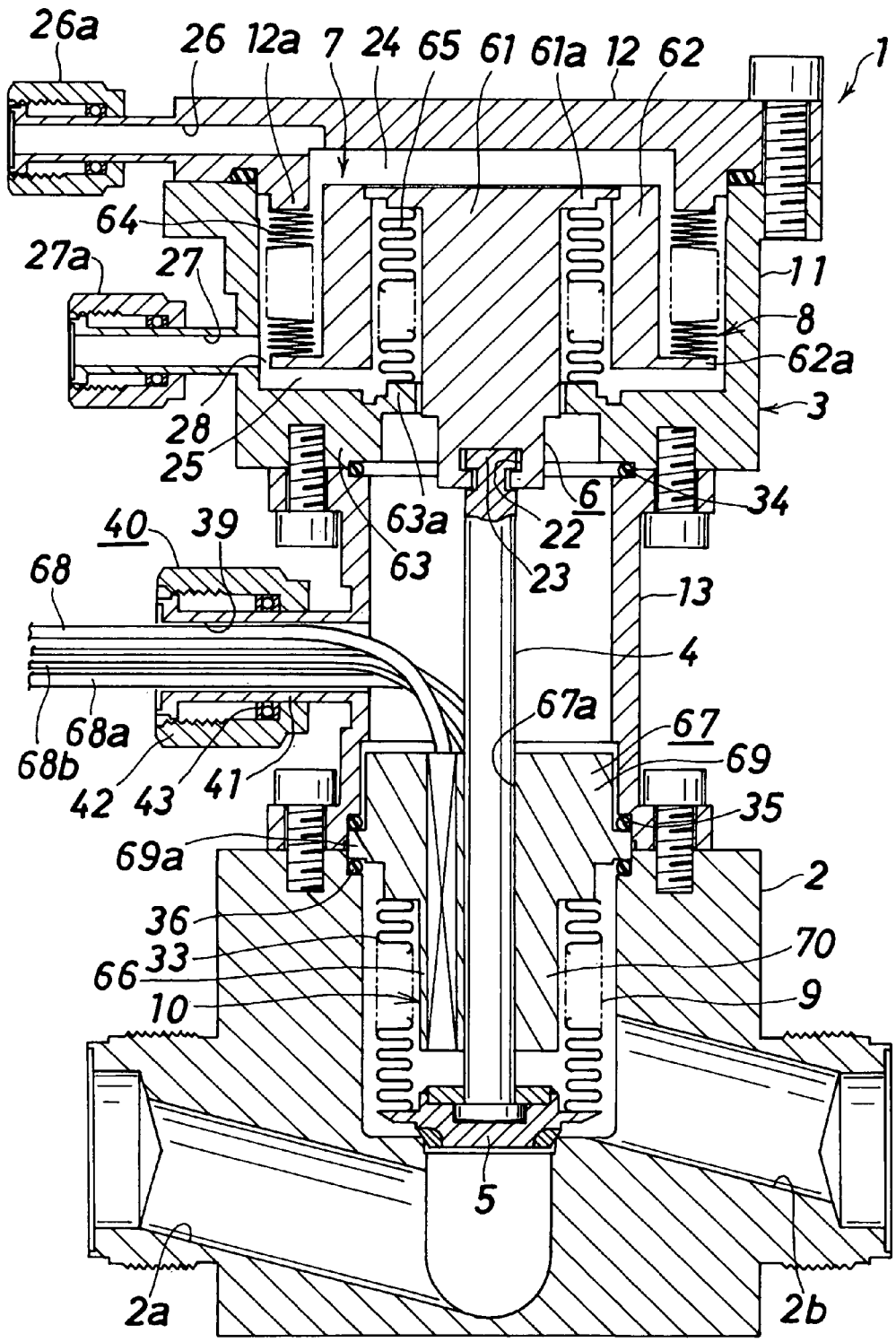
FIG. 2 is a cross-sectional view showing a second embodiment of the heater built-in valve according to this invention.

A second embodiment of the heater built-in valve (1) according to this invention, as shown in FIG. 2, includes the valve box (2) provided with the fluid inflow passage (2a) and the fluid outflow passage (2b), the casing (3) fixed to the upper end portion of the valve box (2), the valve rod (4) that is inserted into the upper portion of the valve box (2) movably upward and downward, and has the upper portion inside the casing (3), the valve element (5) that is suspended and supported by the lower end portion of the valve rod (4) to open and close the fluid inflow passage (2a) with the upward and downward movement of the valve rod (4), the piston (6) fixed to the upper end portion of the valve rod (4), the piston driving means (7) for moving up and down the piston (6), the piston sealing means (8) for sealing between the piston (6) and the casing (3), the valve rod sealing means (9) for sealing between the valve rod (4) and the passages (2a) (2b) inside the valve box (2), and the heating means (10) for heating the vicinity of the valve element (5).

The casing (3) has the cylindrical upper casing (11) having the top wall (12) and opened downward, and the cylindrical lower casing (13) interposed between the upper casing (11) and the valve box (2).

Nickel-phosphorous based nonelectrolytic plating is applied to the whole surface of the valve rod (4), which secures slidability between the valve rod (4) and the casing (3), between the valve rod (4) and the valve element (5), in the joining part between the valve rod (4) and the piston (6), and the like. Accordingly, as in the first embodiment, the slidability at 450° C. and higher is secured without using a grease.

The piston (6) includes a shaft part (61) whose lower end portion is joined to the upper end portion of the valve element (4) and that moves up and down together with the valve rod (4), and an outer cylindrical part (62) that is integral with the shaft part (61) and has an arrangement space for a lower bellows (65) between the shaft part (61) and itself. An arrangement space for an upper bellows (64) is provided between the piston outer cylindrical part (62) and the upper casing (11). A flange part (61a) is provided in an upper end portion of the piston shaft part (61), and an outer circumferential edge portion of the flange part (61a) of the piston shaft part (61) and an upper end portion of the outer cylindrical part (62) are joined so that an upper end surface of the piston shaft part (61), an upper surface of the flange part (61a) and an upper end surface of the outer cylindrical part (62) are coplanar. A flange part (62a) is provided in a lower end portion of the outer cylindrical part (62). In the lower end portion of the piston shaft part (61), the engagement recessed part (22) into which the upper end portion of the valve rod (4) is fitted is formed, and the engagement projected part (23) provided in the upper end portion of the valve rod (4) is fitted in the engagement recessed part (22), which allows the valve rod (4) to be suspended and supported by the piston shaft part (61).

The piston driving means (7) has the upper compressed-air introducing chamber (24) for moving the piston (6) downward by compressed air introduced from outside, and the lower compressed-air introducing chamber (25) for moving the piston (6) upward by compressed air introduced from outside. The upper compressed-air introducing chamber (24) is formed between the upper surface of the piston (6) and the top wall (12) of the upper casing (11). In the top wall (12) of the upper casing (11), the compressed air inlet (26) with the joint (26a) is provided so as to radially extend. The lower compressed-air introducing chamber (25) is formed between a lower surface of the flange part (62a) of the piston outer cylindrical part (62) and an inward flange part (63) provided in a lower end portion of the upper casing (11) so as to be opposed to the lower surface of the flange part (62a). In the circumferential wall of the upper casing (11), the compressed air inlet (27) with the joint (27a) is provided. The gap (28), which is the compressed air passage, is formed between an outer circumferential surface of the flange part (62a) of the piston outer cylindrical part (62) and the circumferential wall of the upper casing (11) so that the compressed air can flow into the lower compressed-air introducing chamber (25) from this compressed air inlet (27).

For the respective joints (26a) (27a) provided in the respective compressed air inlets (26) (27), joints having the same configuration as those in the first embodiment are used.

At the time of downward movement, the piston (6) is prevented from further moving downward by an lower end surface of the piston outer cylindrical part (62) abutting against the inward flange part (63) of the upper casing (11), and at the time of upward movement, the piston (6) is prevented from further moving upward by the upper end surface of the piston shaft part (61) abutting against the lower surface of the casing top wall (12).

The piston sealing means (8) has an upper bellows (64) made of metal that seals the upper compressed-air introducing chamber (24), and a lower bellows (65) made of metal that seals the lower compressed-air introducing chamber (25). The upper bellows (64) is sandwiched and held between an upper surface of the flange part (62a) of the piston outer cylindrical part (62) and a lower surface of a downward projected part (12a) of the casing top wall (12) provided so as to be opposed to the upper surface of the flange part (62a). The lower bellows (65) is sandwiched and held between a lower surface of the flange part (61a) of the piston shaft part (61) and an upper surface of an annular inward projected part (bellows receiving part) (63a) provided in the inward flange part (63) of the upper casing (11) so as to be opposed to the lower surface of the flange part (61a). The upper bellows (64) is placed between the piston outer cylindrical part (62) and the upper casing (11), and receives an outward pressure from the upper compressed-air introducing chamber (24), and receives an inward pressure from the lower compressed-air introducing chamber (25). The lower bellows (65) is placed between the piston shaft part (61) and the piston outer cylindrical part (62), and receives only an inward pressure from the lower compressed-air introducing chamber (25). Accordingly, a diameter of the lower bellows (65) can be made smaller than that of the upper bellows (64), which downsizes the valve (1). Moreover, while in the valve (1) in the first embodiment, an upper end surface of the lower bellows (30) is located below a lower end surface of the upper bellows (29), in the valve (1) of this embodiment, a lower end surface of the lower bellows (65) is located only slightly below a lower end surface of the upper bellows (64), which also reduces a vertical dimension for containing the upper bellows (64) and the lower bellows (65).

The heating means (10) has three cartridge heaters (66) arranged at equally-spaced intervals in a circumferential direction so as to surround a lower portion of the valve rod (4), a heater holding ring (heater holding member) (67) that holds the three cartridge heaters (66) and is fixed astraddle the lower casing (13) and the valve box (2), a heater lead wire (68) including lead wires (68a) of the cartridge heaters (66), lead wires (68b) of TCs (thermo sensors) and the like, and the joint (40) attached to the circumferential edge portion of the through-hole (39) provided in the circumferential wall of the lower casing (13) to draw the heater lead wire (68) to outside.

The heater holding ring (67) has a stepped shape, which includes a large-diameter part (69) and a small-diameter part (70) that continues to a lower end of the large-diameter part (69) and has the same inner diameter as that of the large-diameter part (69), and a smaller outer diameter than that of the large-diameter part (69). The heater holding ring (67) is fixed by sandwiching a flange part (69a) provided in a vertically intermediate portion of the large-diameter part (69) between a lower end portion of the lower casing (13) and the upper end portion of the valve box (2), and a valve-rod insertion hole (67a) that guides the valve rod (4) moving up and down is provided in a radially central portion of the heater holding ring (67).

The three cartridge heaters (66) are connected in series, and are connected to an external power source via the lead wires (68a) of insulating beads having a heatproof temperature of 500° C. and higher. The two TCs (thermo sensors) are installed in the vicinity of the cartridge heaters (66), and are connected to an external circuit via the two lead wires (68b).

For the cartridge heaters (66), a lower end surface position thereof is set so that lower end surfaces of the heaters (66) abut against the valve element (5) in an opening position where the valve rod (4) has moved upward.

The joint (40) has the same configuration as that of the first embodiment, and is provided, in the lower casing (13), with the first sleeve (41) with the flange, which is fixed to the circumferential edge portion of the through-hole (39) by welding, the cap nut (42) rotatably fitted onto the first sleeve (41), the thrust ring (43) interposed between the flange provided in the axially-outer end portion of the first sleeve (41) and the cap nut (42). As shown in FIG. 1, the joint (40) is connected to the external side by the second sleeve (45) with the flange, which is provided on the external side and confronted to the first sleeve (41) with the gasket (44) interposed, and the male screw member (46) that is fitted onto the second sleeve (45) and is screwed into the cap nut (42).

The valve rod sealing means (9) has the valve element-side bellows (33) made of metal sandwiched and held between the outer circumferential edge portion of the valve element (5), whose diameter is made larger than that of the valve rod (4), and a lower end surface of the large-diameter part (69) of the heater holding ring (67).

The respective bellows (33) (64) (65) are fixed by welding, and the metal gaskets (34) (35) (36) are provided at portions requiring the sealing.

According to the heater built-in valve (1) of this invention, when the compressed air is introduced into the upper compressed-air introducing chamber (24) from the compressed air inlet (26) provided in the top wall (12) of the upper casing (11), the piston (6) moves downward, and with this, the valve rod (4) also moves downward. As a result, as shown in figure, the valve element (5) shuts the upward opening of the fluid inflow passage (2a). When the introduction of the compressed air into the upper compressed-air introducing chamber (24) is stopped to enable the discharge, and the compressed air is introduced into the lower compressed-air introducing chamber (25) from the compressed air inlet (27) provided in the circumferential wall of the upper casing (11), the piston (6) moves upward, and with this, the valve rod (4) also moves upward. As a result, the valve element (5) departs from the upward opening of the fluid inflow passage (2a), and the fluid introduced from the fluid inflow passage (2a) is discharged from the fluid outflow passage (2b).

A downward force that the piston (6) receives from the upper compressed-air introducing chamber (24) is made relatively large because the upper surface of the piston (6) having a large area receives a pressure of the compressed air, so that a force for shutting the fluid inflow passage (2a) is made large. Moreover, since a capacity of the lower compressed-air introducing chamber (25) is smaller than a capacity of the upper compressed-air introducing chamber (24), when the compressed air is introduced into the lower compressed-air introducing chamber (25), the upward force is immediately generated, which makes the upward movement of the valve rod (4) quick.

Thus, as to the type where the cartridge heaters (66) are not moved up and down together with the valve rod (4) as well, the valve usable under a high-temperature condition beyond 200° C. can be attained.

Figure 3:
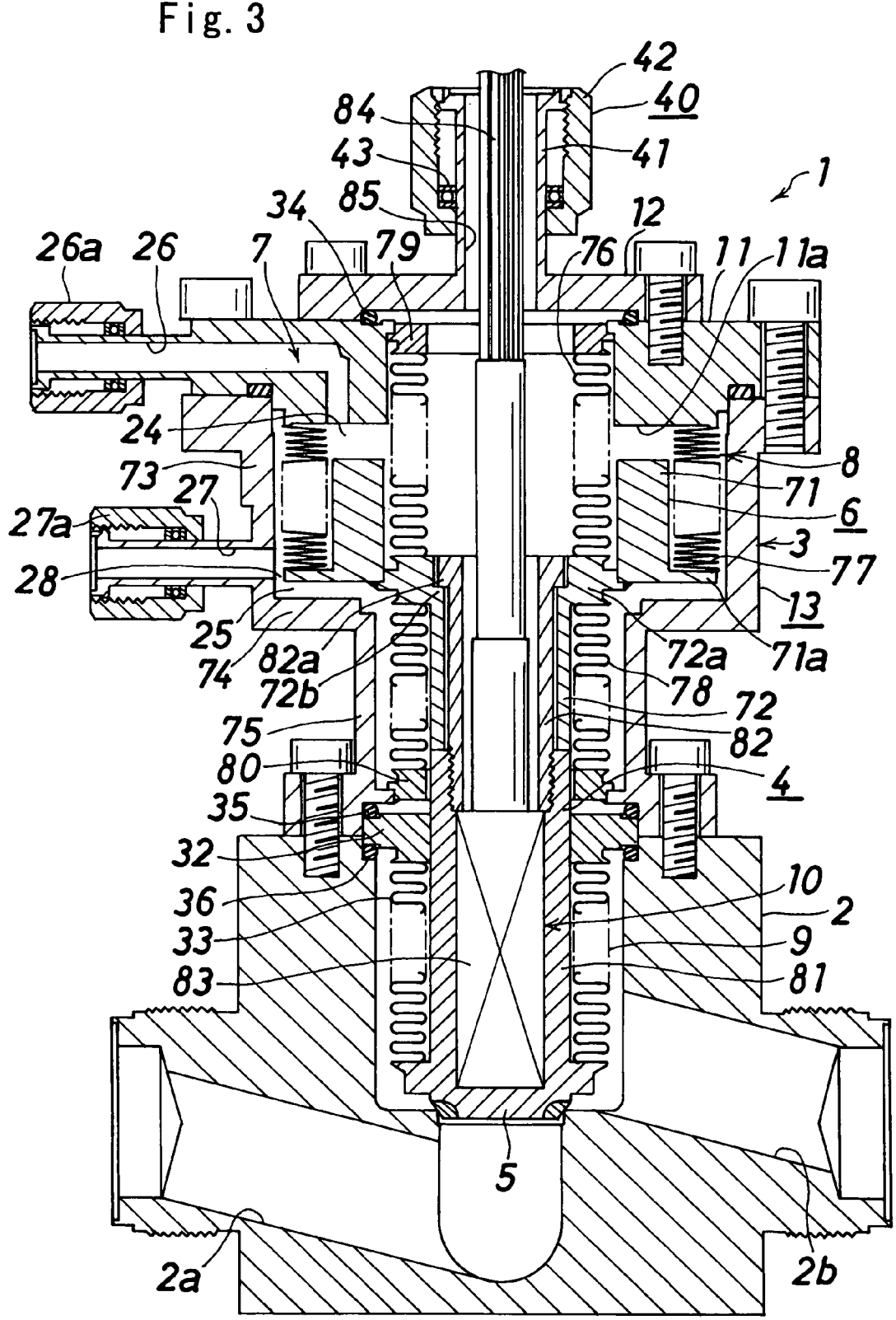
FIG. 3 is a cross-sectional view showing a third embodiment of the heater built-in valve according to this invention.

FIG. 3 shows an embodiment (third embodiment) in which the heater (cartridge heater) is moved up and down together with the valve rod (4) as in the first embodiment.

The heater built-in valve (1) of this embodiment, as shown in FIG. 3, includes the valve box (2) provided with the fluid inflow passage (2a) and the fluid outflow passage (2b), the casing (3) fixed to the upper end portion of the valve box (2), the valve rod (4) that is inserted into the upper portion of the valve box (2) movably upward and downward, and has the upper portion is inside the casing (3), the valve element (5) that is suspended and supported by the lower end portion of the valve rod (4) to open and close the fluid inflow passage (2a) with the upward and downward movement of the valve rod (4), the piston (6) fixed to the upper end portion of the valve rod (4), the piston driving means (7) for moving up and down the piston (6), the piston sealing means (8) for sealing between the piston (6) and the casing (3), the valve rod sealing means (9) for sealing between the valve rod (4) and the passages (2a) (2b) inside the valve box (2), and the heating means (10) for heating the vicinity of the valve element (5).

The casing (3) has the cylindrical upper casing (11) having the top wall (12) and opened downward, and the cylindrical lower casing (13) interposed between the upper casing (11) and the valve box (2).

Nickel-phosphorous based nonelectrolytic plating is applied to the whole surface of the valve rod (4), which secures slidability between the valve rod (4) and the casing (3), between the valve rod (4) and the valve element (5), in the joining part between the valve rod (4) and the piston (6), and the like. Accordingly, as in the first embodiment, the slidability at 450° C. and higher is secured without using a grease.

The piston (6) includes a large-diameter cylindrical part (71) that moves up and down inside an upper portion of the lower casing (13), and a small-diameter cylindrical part (72) that continues below the large-diameter cylindrical part (71) and moves up and down inside a lower portion of the lower casing (13). Correspondingly, the lower casing (13) is provided with a large-diameter piston containing part (73) on the upper side, and a small-diameter piston containing part (75) that continues below this with a step part (74) interposed.

The upper casing (11) has an inner diameter slightly smaller than an inner diameter of the piston large-diameter cylindrical part (71), and as a result, a lower surface (11a) of the upper casing (11) has an annular surface portion opposed to the step part (74) of the lower casing (13). Thereby, an arrangement space for the piston large-diameter cylindrical part (71) and a bellows (77) is formed between the lower surface (11a) of the upper casing (11) and the step part (74) of the lower casing (13).

The piston driving means (7) has the upper compressed-air introducing chamber (24) for moving the piston (6) downward by the compressed air introduced from outside, and the lower compressed-air introducing chamber (25) for moving the piston (6) upward by the compressed air introduced from outside.

The piston sealing means (8) has first and second upper bellows (76) (77) made of metal that seal the upper compressed-air introducing chamber (24), and a lower bellows (78) made of metal that seals the lower compressed-air introducing chamber (25).

A flange part (71a) for receiving the second upper bellows (77) is formed in a lower end portion of the piston large-diameter cylindrical part (71). A flange part (72a) is provided in an upper end portion of the piston small-diameter cylindrical part (72), and an outer circumferential edge portion thereof is fixed to the lower end portion of the piston large-diameter cylindrical part (71). The flange part (72a) of the piston small-diameter cylindrical part (72) serves as a bellows receiving part that receives a lower end portion of the first upper bellows (76) at an upper surface thereof, and receives an upper end portion of the lower bellows (78) at a lower surface thereof.

As to the first and second upper bellows (76) (77) that seal the upper compressed-air introducing chamber (24), the first upper bellows (76) having a relatively small diameter is arranged inside the piston large-diameter cylindrical part (71), and the second upper bellows (77) having a relatively large diameter is arranged outside the piston large-diameter cylindrical part (71), respectively. As to the first upper bellows (76), an upper end portion thereof is fixed to a fixed ring (bellows receiving part) (79) provided in an inner circumference of the upper casing (11) in a position above an upper end of the piston large-diameter cylindrical part (71), and a lower end portion thereof is fixed to the upper surface of the flange part (72a) of the piston small-diameter cylindrical part (72), which allows the first upper bellows (76) to be sandwiched and held between the upper casing (11) and the piston (6). As for the second upper bellows (77), an upper end portion thereof is fixed to the lower surface (11a) of the upper casing (11) serving as the bellows receiving part as well in a piston above the upper end of the piston large-diameter cylindrical part (71), and a lower end portion thereof is fixed to the flange part (71a) of the piston large-diameter cylindrical part (71), which allows the second upper bellows (77) to be sandwiched and held between the upper casing (11) and the piston (6).

In this manner, the two upper bellows (76) (77) are provided, and the annular upper compressed-air introducing chamber (24) is formed by the upper end surface of the piston large-diameter cylindrical part (71), the upper casing (11), the first upper bellows (76) and the second upper bellows (77).

The lower bellows (78) is arranged outside the piston small-diameter cylindrical part (72), and the upper end portion thereof is fixed to a lower surface of the flange part (72a) of the piston small-diameter cylindrical part (72), and a lower end portion thereof is fixed to a fixed ring (bellows receiving part) (80) provided in the circumferential wall near the lower end portion of the lower casing (13), which allows the lower bellows (78) to be sandwiched and held between the lower casing (13) and the piston (6). The lower compressed-air introducing chamber (25) is formed by the circumferential wall of the lower casing (13), the second upper bellows (77), the lower end portion of the piston large-diameter cylindrical part (71) and the lower bellows (78).

In the circumferential wall of the upper casing (11), the L-shaped compressed air inlet (26) with the joint (26a) is provided. In the compressed air inlet (26), one end side where the joint (26a) is provided opens radially outward and an opening at another end extends axially downward and opens in lower side of the upper casing (11) radially inside the second upper bellows (77). The compressed air inlet (27) with the joint (27a) is provided in a lower end portion of a circumferential wall of the large-diameter piston containing part (73) of the lower casing (13). The gap (28), which is the compressed air passage, is formed between an outer circumferential surface of the flange part (71a) of the piston large-diameter cylindrical part (71) and the circumferential wall of the lower casing (13) so that the compressed air can flow into the lower compressed-air introducing chamber (25) from this compressed air inlet (27).

At the time of the downward movement, the piston (6) is prevented from further moving downward by the lower end surface of the piston large-diameter cylindrical part (71) abutting against the upper surface of the step part (74) of the lower casing (13), and at the time of upward movement, the piston (6) is prevented from further moving upward by the upper end surface of the piston large-diameter cylindrical part (71) abutting against the lower surface (11a) of the upper casing (11).

The valve rod sealing means (9) has the valve element-side bellows (33) made of metal sandwiched and held between the outer circumferential edge portion of the valve element (5), whose diameter is made larger than that of the valve rod (4), and the fixed ring (bellows receiving part) (32) fixed to an inner circumferential surface of the circumferential-wall lower end portion of the lower casing (13).

The valve rod (4) includes a lower cylindrical body (81) having the valve element (5) at a lower end thereof and an upper cylindrical body (82) having, in an outer circumference of the lower end portion, a male screw portion screwed into a female screw portion provided in an inner circumference of an upper end portion of the lower cylindrical body (81), and has a hollow shape with an upper end opened.

The heating means (10) has a cartridge heater (83) that is arranged inside the valve rod (4) in a hollow shape and moves up and down together with the valve rod (4), a heater lead wire (84) including a lead wire of the cartridge heater (83), a lead wire of a TC (thermo sensor) and the like, and the joint (40) attached to a circumferential edge portion of a through-hole (85) provided in the casing top wall (12) to draw the heater lead wire (84) to outside.

A terminal end of the upper cylindrical body (82) of the valve rod (4) abuts against an upper end of the cartridge heater (83) by being screwed into the lower cylindrical body (81). Moreover, a flange part (82a) is provided in an upper end portion of the upper cylindrical body (82) of the valve rod (4), and a lower surface of this flange part (82a) abuts against a step surface (72b) provided in the upper surface of the flange part (72a) of the piston small-diameter cylindrical part (72). By screwing the upper cylindrical body (82) into the lower cylindrical body (81), the piston small-diameter cylindrical part (72) is sandwiched and held between a lower surface of the flange part (82a) of the upper cylindrical body (82) and an upper end surface of the lower cylindrical body (81) in the valve rod (4), and while preventing the core deviation in this manner, the valve rod (4) including the lower cylindrical body (81) and the upper cylindrical body (82) and the piston (6) including the piston large-diameter cylindrical part (71) and the piston small-diameter cylindrical part (72) are integrated with each other.

The joint (40) for drawing the heater lead wire (84) to outside has the same configuration as that of the first embodiment although an installation position is different, and the first sleeve (41) with the flange, which is fixed to the circumferential edge portion of the through-hole (39) by welding, the cap nut (42) rotatably fitted onto the first sleeve (41), the thrust ring (43) interposed between the flange provided in the axially-outer end portion of the first sleeve (41) and the cap nut (42) are provided in the casing top wall (12). As shown in FIG. 1, the joint (40) is connected to outside by the second sleeve (45) with the flange, which is provided on the external side and is confronted to the first sleeve (41) with the gasket (44) interposed, and the male screw member (46) that is fitted onto the second sleeve (45) and is screwed into the cap nut (42).

In this manner, the heater lead wire (84) extends upward from the cartridge heater (83) and the sensor to be continuously drawn upward, which reduces load on the heater lead wire (84) when the valve rod (4) moves up and down.

The respective bellows (33) (76) (77) (78) are fixed by welding, and the metal gaskets (34) (35) (36) are provided in portions requiring sealing.

According to the heater built-in valve (1) of this invention, when the compressed air is introduced into the upper compressed-air introducing chamber (24) from the compressed air inlet (26) provided in the upper casing (11), the piston (6) moves downward, and with this, the valve rod (4) also moves downward. As a result, as shown in the figure, the valve element (5) shuts the upward opening of the fluid inflow passage (2a). When the introduction of the compressed air into the upper compressed-air introducing chamber (24) is stopped to enable the discharge, and the compressed air is introduced into the lower compressed-air introducing chamber (25) from the compressed air inlet (27) provided in the circumferential wall of the upper casing (11), the piston (6) moves upward, and with this, the valve rod (4) also moves upward. As a result, the valve element (5) departs from the upward opening of the fluid inflow passage (2a), and the fluid introduced from the fluid inflow passage (2a) is discharged from the fluid outflow passage (2b).

According to the heater built-in valve (1) of the third embodiment, as in the first embodiment, the cartridge heater (83) can be moved up and down together with the valve rod (4), and in the handling of the heater lead wire (84), which is a problem in this case, drawing out the heater lead wire (84) upward reduces the load on the heater lead wire (84) when the valve rod (4) moves up and down as compared with the first embodiment, so that the valve is more suitable for the use under the high-temperature condition beyond 200° C.

INDUSTRIAL APPLICABILITY

According to this invention, the problem of a conventional heater built-in valve that it cannot endure a high temperature such as higher than 200° C. is solved, and thus, an application range of the heater built-in valve can be largely enlarged.

The invention claimed is:

1. A heater built-in valve comprising
a valve box provided with a fluid passage, a casing provided above the valve box,
a valve rod that moves up and down a valve element opening and closing the fluid passage,
a piston that is arranged movably upward and downward inside the casing and is fixed to the valve rod,
piston driving means for moving up and down the piston,
heating means for heating a vicinity of the valve element, and
sealing means for sealing between the piston and the casing,
the heater built-in valve, wherein
the piston driving means has an upper compressed-air introducing chamber for moving the piston downward, and a lower compressed-air introducing chamber for moving the piston upward, and
the sealing means has an upper bellows that seals the upper compressed-air introducing chamber, and a lower bellows that seals the lower compressed-air introducing chamber,
the piston includes a large-diameter cylindrical part and a small-diameter cylindrical part that continues below the large-diameter cylindrical part, and
a first upper bellows which upper end is placed above an upper end of the piston large-diameter cylindrical part, and which is arranged inside the piston large-diameter cylindrical part, and
a second upper bellows which upper end is placed above the upper end of the piston large-diameter cylindrical part, and which is arranged outside the piston large-diameter cylindrical part, respectively, so that
bellows receiving parts that support the upper end portions of the respective bellows are provided in an upper portion of the casing, by which
the upper compressed-air introducing chamber is formed by an upper end surface of the piston large-diameter cylindrical part, the upper portion of the casing, the first upper bellows and the second upper bellows, while
a lower bellows is arranged outside the piston small-diameter cylindrical part, and
a bellows receiving part that supports a lower end surface of the lower bellows is provided in a circumferential wall of the casing, by which
the lower compressed-air introducing chamber is formed by the circumferential wall of the casing, the second upper bellows, a lower end portion of the piston large-diameter cylindrical part and the lower bellows.

2. The heater built-in valve according to claim 1, wherein
the valve rod is made hollow, and
a heater and a sensor of the heating means are arranged inside of the valve rod, and
a lead wire of the heating means is pulled out from an opening at an upper end of the valve rod to be drawn out from a top wall of the casing.

3. The heater built-in valve according to claim 1, wherein
a through-hole into which a lead wire of the heating means is inserted and which is provided in the casing, and
a joint for drawing the lead wire of the heating means to outside is attached to a circumferential edge portion of this through-hole,
the joint having the same configuration as joints for connecting piping to the upper compressed-air introducing chamber and the lower compressed-air introducing chamber.

4. The heater built-in valve according to claim 3, wherein
the joint for drawing the lead wire of the heating means to outside has
a first sleeve fixed to the circumferential edge portion of the through-hole,
a cap nut rotatably fitted onto the first sleeve,
a second sleeve connected to the first sleeve with a gasket interposed, and
a male screw member that is fitted onto the second sleeve and is screwed into the cap nut.

5. The heater built-in valve according to claim 1, wherein special coating is applied to a sliding portion.

6. The heater built-in valve according to claim 5, wherein the special coating is coating with nonelectrolytic plating treatment.

7. The heater built-in valve according to claim 6, wherein a nonelectrolytic plating layer is made of any one of nickel-phosphorous based, cobalt-phosphorous based, nickelphosphorous-tungsten based, nickel-boron based, and nickel-boron-tungsten based nonelectrolytic plating layers.

8. The heater built-in valve according to claim 1, wherein the heating means has a heater that is attached to the valve rod so as to be movable together with the valve rod, and a lower end surface of the heater abuts against the valve element.

9. The heater built-in valve according to claim 1, wherein the heating means has a heater that is attached to a heater holding member fixed to the casing so as not to move with the movement of the valve rod, and a lower end surface of the heater abuts against the valve element in an opening position where the valve rod has moved upward.

* * * * *